United States Patent
Pesch et al.

(10) Patent No.: US 6,942,563 B2
(45) Date of Patent: Sep. 13, 2005

(54) AIR-GUIDING APPLIANCE

(75) Inventors: Michael Pesch, Erlenbach (DE); Peter Hamke, Lohne (DE); Thomas Bauer, Eppingen-Muhlbach (DE)

(73) Assignee: Utescheny AG, Zaisenhausen (DE)

( * ) Notice: Subject to any disclaimer, the term of this patent is extended or adjusted under 35 U.S.C. 154(b) by 0 days.

(21) Appl. No.: 10/792,521

(22) Filed: Mar. 2, 2004

(65) Prior Publication Data

US 2004/0166794 A1  Aug. 26, 2004

Related U.S. Application Data

(63) Continuation of application No. PCT/DE02/03363, filed on Sep. 10, 2002.

(30) Foreign Application Priority Data

Sep. 11, 2001 (DE) .......................... 101 44 755

(51) Int. Cl.[7] ................................ B60H 1/34
(52) U.S. Cl. ................. 454/152; 454/284; 454/333; 454/334
(58) Field of Search .................. 454/75, 108, 109, 454/115, 141, 142, 152, 155, 256, 284, 333, 334, 367

(56) References Cited

FOREIGN PATENT DOCUMENTS

| | | | |
|---|---|---|---|
| DE | 19612764 A1 * | 10/1997 | ............ F24F/13/06 |
| DE | 196 48 736 C1 | 1/1998 | |
| DE | 19807292 A1 * | 9/1998 | ............ B60H/1/34 |
| EP | 1 059 178 A2 | 12/2000 | |
| JP | 60 244618 A1 | 12/1985 | |

* cited by examiner

*Primary Examiner*—Jiping Lu
(74) *Attorney, Agent, or Firm*—Darby & Darby

(57) ABSTRACT

An air-guiding appliance (10) for the directionally defined introduction (R) of air (L) supplied on the rear side (20) of the appliance into a space (22), in particular interior of a vehicle, having a housing (26), at least one duct (24) in which the air (L) is supplied to the housing (26), an air-guiding device (12) which has recesses (14) on the front side and by means of which the direction (R) of the air flowing out into the space (22) can be defined, means for setting the direction (R) of the air-guiding device (12) and, if appropriate, means for setting the quantity of the air flowing into the space (22), is distinguished by the fact that a jet pipe (30) which can be displaced in and counter to the direction of the supplied air (L) is arranged in the housing (26) or in the duct (24) and its air outlet opening (28) is smaller in size than the cross-sectional surface of the air-guiding device (12), in which case, in the retracted position of the jet pipe (30), the air (L) emerges from the air-guiding device (12) with a diffused outflow profile and, in the extended position of the jet pipe (30), the air outlet opening (32) of said jet pipe is brought so close to the inside of the air-guiding device (12) that the air emerges with a focused outflow profile (42).

19 Claims, 2 Drawing Sheets

AIR-GUIDING APPLIANCE

This application is a Continuation of International Patent Application No. PCT/DE02/03363, filed Sep. 10, 2002, which published in German on Mar. 20, 2003 as WO 03/022610 A1.

TECHNICAL FIELD

The present invention relates to an air-guiding appliance for the directionally defined introduction of air supplied on the rear side of the appliance into a space, in particular interior of a vehicle, having a housing, at least one duct in which the air is supplied to the housing, an air-guiding device which has recesses on the front side and by means of which the direction of the air flowing out into the space can be defined, means for setting the direction of the air-guiding device and, if appropriate, means for setting the quantity of the air flowing into the space.

Such air-guiding appliances are used in great numbers in the interior of motor vehicles to control the air flow (direction and mass).

PRIOR ART

Air-guiding appliances are known which have "slat-type or roll-type dischargers" to control the direction of the air flow. In this case, visible and pivotable horizontal and vertical slats are pivoted by manual actuation via a mechanism "upward/downward" and "to the right/left" and the air flow is therefore controlled. The quantity of emerging air is set here manually via a hand wheel which acts on the position of a pivotable flap arranged in the air-supply duct. This "open manner of construction" interferes with the optics or the design of the dashboard of a motor vehicle. The air-guiding appliance acts as a foreign body. In addition, the horizontal and vertical slats have a tendency to become dirty due to dust collecting in the corner regions which are accessible only with difficulty for cleaning purposes.

An air-guiding appliance of the type mentioned at the beginning is disclosed in EP 1 059 178 A2. In this case, use is made of an elastic air-guiding body which has through-going recesses through which the air flows. The direction of the air which flows out in a diffused manner can be set by a relative movement of the front side or rear side of the air-guiding body.

SUMMARY OF THE INVENTION

Starting from the abovementioned prior art, the present invention is based on the object or the technical problem of specifying an air-guiding appliance which ensures that the direction of the air flow is set in a simple and lastingly reliable manner, makes economical production and installation possible and allows very high requirements in terms of design to be met, and in which a different outflow profile can be set in a simple manner.

The air-guiding appliance according to the invention is specified by the features of independent claim 1. Advantageous refinements and developments are the subject matter of the dependent claims.

Accordingly, the air-guiding appliance according to the invention is distinguished by the fact that a jet pipe which can be displaced in and counter to the direction of the supplied air is arranged in the housing or in the duct and its air outlet opening is smaller in size than the cross-sectional surface of the air-guiding device, in which case, in the retracted position of the jet pipe, the air emerges from the air-guiding device with a diffused outflow profile and, in the extended position of the jet pipe, the air outlet opening of said jet pipe is brought so close to the inside of the air-guiding device that the air emerges with a focused outflow profile.

According to one preferred embodiment, the cross-sectional shape of the jet pipe corresponds essentially to the cross-sectional shape of the duct.

With the guiding appliance according to the invention it is easily possible to produce a diffused outflow profile in which the jet pipe is situated in the pushed-in state in the air duct. A strong, focused outflow profile is set by the jet pipe being extended on the inside until it is nearly in front of the displacement plate.

One particularly advantageous refinement is distinguished by the fact that there is a control device which acts on a displacement mechanism for displacing the jet pipe in the longitudinal direction.

The control device can be actuated manually. However, it is also possible to use a control device which controls the displacement of the jet pipe as a function of the supplied quantity of air in such a manner that the greater the quantity of air supplied, the further is the jet pipe extended in the direction of the air-guiding device. One advantageous embodiment which is structurally particularly simple to provide is distinguished by the fact that the control device controls the displacement of the jet pipe as a function of the angular position of a flap arranged rotatably in the duct.

In one variant embodiment, the control device is designed in such a manner that it brings about a complete extension of the jet pipe only when the air supplied is at maximum quantity or the flap is completely open.

One particularly preferred refinement, which makes possible a diffused outflow with a settable outflow direction and, on the other hand, a strong, focused outflow profile, is distinguished by the fact that the air-guiding device has an air-guiding body made of elastically deformable material with through-going recesses, means for displacing the rear side of the air-guiding body with respect to the fixed front side of the air-guiding body are provided, or vice versa, and the displacement means are acted upon by means for setting the direction, so that a desired position of the through-going recesses and therefore the desired inflow direction can be set.

In one advantageous development, the air-guiding body has, on the inside, a displacement plate with corresponding recesses, the displacement means acting on the displacement plate. This causes a relative displacement between the rear side and front side of the elastic air-guiding body, so that the direction of the outflowing air can be set by this defined displacement.

The through-going recesses can be arranged parallel to one another at least in some regions or, according to a preferred exemplary embodiment, can be arranged at a defined angle in some regions.

The through-going recesses can have a round, polygonal, oval or other cross section.

One variant embodiment which meets high requirements in terms of design is distinguished by the fact that the front side of the air-guiding device or of the air body is of three-dimensional design, in particular has a spherically convex curvature.

It is particularly advantageous to arrange a perforated screen on the front side of the air-guiding device or of the air-guiding body, said perforated screen preferably consisting of high-quality design material.

Further embodiments and advantages of the invention emerge through the features furthermore cited in the claims and through the exemplary embodiment specified below. The features of the claims can be combined with one another in any desired manner provided that they are not obviously mutually exclusive.

BRIEF DESCRIPTION OF THE DRAWING

The invention and an advantageous embodiment and development of the same is described and explained in greater detail below with reference to the example illustrated in the drawing. The features which can be gathered from the description and the drawing can be used according to the invention individually or in any desired combination. In the drawing.

WAYS OF IMPLEMENTING THE INVENTION

Figure 1:
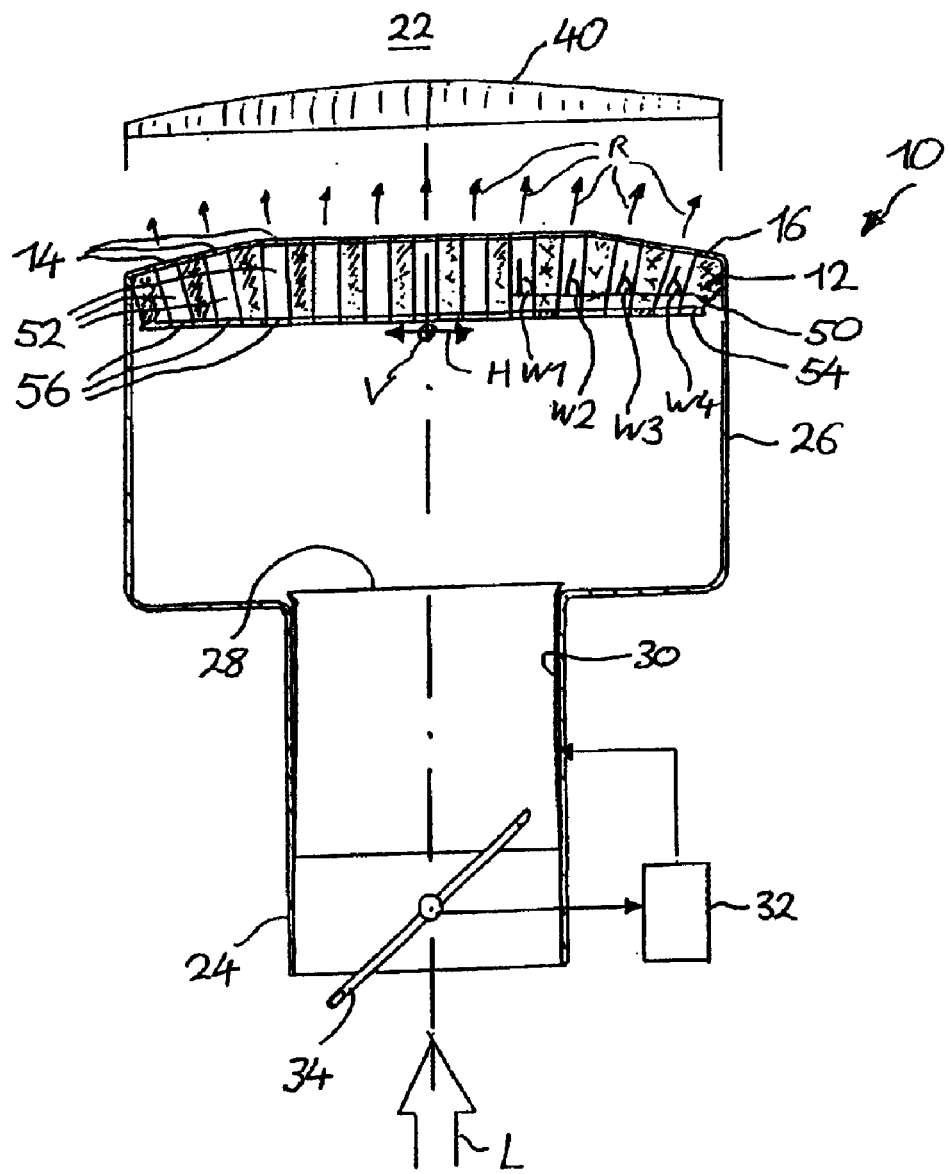
FIG. 1 shows a schematic longitudinal section through an air-guiding appliance with longitudinally displaceable jet pipe in the retracted position.

An air-guiding appliance 10 which is illustrated schematically in longitudinal section in the figures has a housing 26 which is essentially rectangular in cross section and to which a duct 24 is connected on the rear side. Via the duct 24, air L is supplied to the housing 26 on the rear side, i.e. from below in FIG. 1. Furthermore, a rotatable flap 34 is arranged in the duct 24 and can be used to control the quantity of inflowing air L. On its front side, the housing 26 is provided with a perforated screen 16 having recesses 14 arranged in a grid-like manner. On the rear side, an air-guiding device 12 is connected to the perforated screen 16, said air-guiding device having an air-guiding body 50 which consists of elastic material, in particular foam, and is designed as a relatively thick plate. The air-guiding body 50 has through-going recesses 52 which correspond with the recesses 14 of the perforated screen 16. On the rear side, a displacement plate 54 is connected to the air-guiding body 50, said displacement plate likewise having recesses 56 which correspond with the through-going recesses 52 of the air-guiding body 50.

The direction of the through-going recesses 52 determines the direction R of the air L emerging from the air-guiding appliance 10. Displacement of the displacement plate 54 in the directions V and H, which are perpendicular to each other, enables the direction R of the emerging air to be set within the predetermined structural framework. An appliance of this type is described in European patent application 1 059 178. The displacement mechanisms and adjusting elements required for displacing the displacement plate 54 are not illustrated in greater detail in the figures for reasons of clarity.

The air-guiding device 12 is designed in such a manner that the air flows out of the air-guiding appliance 10 with a diffused outflow profile 40.

The rear side, from which the air-guiding appliance 10 is acted upon with air L, is specified by the reference number 20 in the figures. The space in which the air flows out is specified by the reference number 22 in the figures.

Furthermore, a jet pipe 30 is arranged within the duct 24, the jet pipe being displaceable in the longitudinal direction of the duct and having essentially the same cross-sectional area as the duct 24. In FIG. 1, the jet pipe 30 is in the retracted position, i.e. the air-guiding appliance 10 discharges the air into the space 22 with the diffused outflow profile 40, since the jet pipe 30 does not have any influence on the flow.

Figure 2:
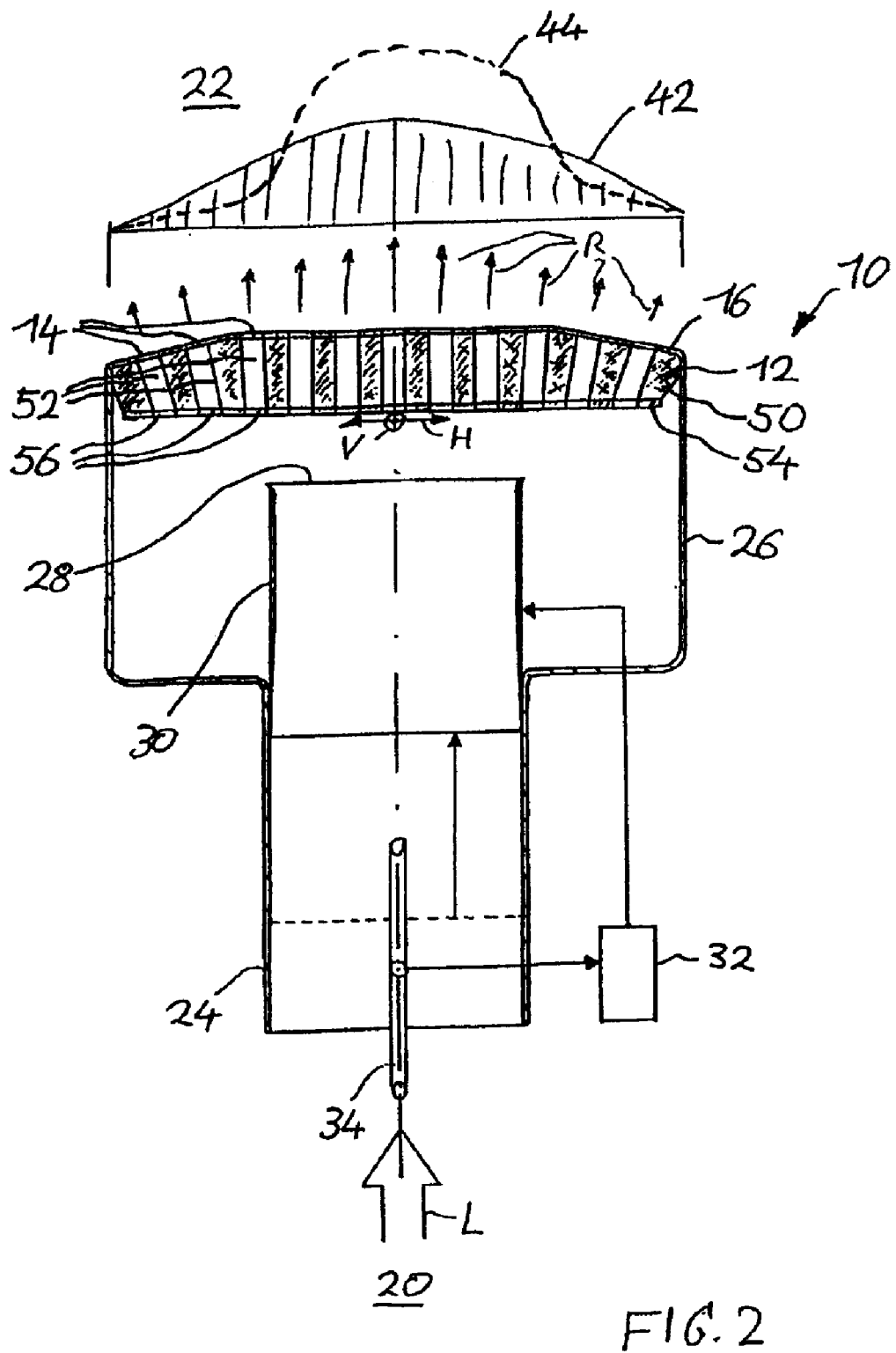
FIG. 2 shows a schematic longitudinal section through an air-guiding appliance with a longitudinally displaceable jet pipe in the extended position.

In FIG. 2, the jet pipe 30 is illustrated in the extended position, i.e. the air outlet opening 28 of the jet pipe 30 is arranged displaced toward the inside of the air-guiding device 12. A strongly focused outflow profile 42, as is illustrated at the top of FIG. 2 in the form of a diagram, arises in this position of the jet pipe 30. Depending on the structural configuration, an alternative outflow profile 44 which has a stronger focus can be produced.

The figures furthermore schematically illustrate a control device 32 which brings about the displacement of the jet pipe 30 as a function of the angular position of the flap 34. In the present exemplary embodiment, the jet pipe 30 remains in the retracted state if the flap 34 is not completely open. As soon as the flap 34 is in a completely open position according to FIG. 2, the control device 32 brings about the extension of the jet pipe 30 into the extended position illustrated in FIG. 2. The structural configuration of the means for displacing the jet pipe are not illustrated in the figures. However, there is no problem whatsoever for the expert to structurally realize these means.

The through-going recesses 52 of the air-guiding body 50 are at a different angle to the direction H in some regions. In the central region, the recesses 52 are arranged parallel to one another and run parallel to the direction of the inflowing air L. Toward the edge region, the last three recesses 52 in each case are inclined outward with an increasing angle W1, W2, W3, W4. The outer surface of the air-guiding body 50 or of the perforated screen 16 has a slightly convex curvature to the outside.

What is claimed is:

1. An air-guiding appliance for the directionally defined introduction of air supplied on the rear side of the appliance into a space, in particular the interior of a vehicle, comprising:

a housing;

at least one duct through which air is supplied to the housing, an air-guiding device at an open end of the housing and having recesses on a front side of the air guiding device and defining a direction of the air flowing out into the space;

means for setting the direction of the air-guiding device and means for setting a quantity of the air flowing into the space, said means including:

a jet pipe displaced in a first direction no further than the end of the housing and counter direction to the direction of the supplied air;

wherein the jet pipe is arranged in at least one of the housing and the duct;

the jet pipe comprising an air outlet opening substantially smaller in size than a cross sectional surface of the air-guiding device;

in a retracted position of the jet pipe, the air emerges from the air-guiding device with a diffused outflow profile; and in the extended position of the jet pipe, the air outlet opening of said jet pipe is brought within proximity to the inside of the air-guiding device wherein the air emerges with a focused outflow profile.

2. The air-guiding appliance as claimed in claim 1, wherein the cross sectional shape of the jet pipe corresponds essentially to the cross sectional shape of the duct.

3. The air-guiding appliance as claimed in claim 1 or 2, wherein a control device acts on a displacement mechanism for displacing the jet pipe.

4. The air-guiding appliance as claimed in claim 3, wherein the control device can be actuated manually.

5. The air-guiding appliance as claimed in claim 3, wherein the control device controls the displacement of the jet pipe as a function of the supplied quantity of air in such a manner that the greater the quantity of air supplied, the further the jet pipe is extended in the direction of the air-guiding device.

6. The air-guiding appliance as claimed in claim 5, wherein the control device controls the displacement of the jet pipe as a function of the angular position of a flap arranged rotatably in the duct.

7. The air-guiding appliance as claimed in claim 6, wherein the control device brings about a complete extension of the jet pipe only when the air supplied is at maximum quantity with the flap completely open.

8. The air-guiding appliance as claimed in claim 1 or 2, wherein the air-guiding device has an air-guiding body made of elastically deformable material with through going recesses, means for displacing the rear side of the air-guiding body with respect to the fixed front side of the air-guiding body are provided, or vice versa, and the displacement means are acted upon by means for setting the direction, so that a desired position of the through going recesses and therefore the desired inflow direction can be set.

9. The air-guiding appliance as claimed in claim 8, wherein the air-guiding body has, on the inside, a displacement plate with corresponding recesses, the displacement means acting on the displacement plate.

10. The air-guiding appliance as claimed in claim 8, wherein the through going recesses are arranged parallel to one another at least in some regions.

11. The air-guiding appliance as claimed in claim 8, wherein the through going recesses are arranged at a defined angle with respect to one another at least in some regions.

12. The air-guiding appliance as claimed in claim 8, wherein the through going recesses have a round, polygonal or oval cross section.

13. The air-guiding appliance as claimed in claim 1, wherein the front side of the air-guiding device or of the air-guiding body is a three dimensional design, having a spherically convex curvature.

14. The air-guiding appliance as claimed in claim 1, wherein a perforated screen is arranged on the front side of the air-guiding device or of the air-guiding body.

15. The air-guiding appliance as claimed in claim 14, wherein the perforated screen consists of high quality design material.

16. The air-guiding appliance as claimed in claim 1 or 2, wherein the through-going recesses have different cross sectional areas from one another.

17. The air-guiding appliance as claimed in claim 8, wherein the front side of the air-guiding device or of the air-guiding body is a three dimensional design, having a spherically convex curvature.

18. The air-guiding appliance as claimed in claim 8, wherein a perforated screen is arranged on the front side of the air-guiding device or of the air-guiding body.

19. The air-guiding appliance as claimed in claim 18, wherein the perforated screen consists of high quality design material.

* * * * *